United States Patent
Buehler et al.

(10) Patent No.: US 9,974,329 B2
(45) Date of Patent: May 22, 2018

(54) AEROSOL-GENERATING SYSTEM COMPRISING A CYLINDRICAL POLYMERIC CAPSULE

(71) Applicant: Philip Morris Products S.A., Neuchatel (CH)

(72) Inventors: Frederic Ulysse Buehler, Neuchatel (CH); Robert Emmett, Neuchatel (CH)

(73) Assignee: Philip Morris Products S.A., Neuchatel (CH)

( * ) Notice: Subject to any disclaimer, the term of this patent is extended or adjusted under 35 U.S.C. 154(b) by 141 days.

(21) Appl. No.: 15/109,338

(22) PCT Filed: Dec. 31, 2014

(86) PCT No.: PCT/EP2014/079496
§ 371 (c)(1),
(2) Date: Jun. 30, 2016

(87) PCT Pub. No.: WO2015/101651
PCT Pub. Date: Jul. 9, 2015

(65) Prior Publication Data
US 2016/0338402 A1   Nov. 24, 2016

(30) Foreign Application Priority Data
Jan. 2, 2014 (EP) .................................. 14150025

(51) Int. Cl.
*A61H 33/12* (2006.01)
*F17C 7/04* (2006.01)
(Continued)

(52) U.S. Cl.
CPC ............ *A24B 15/16* (2013.01); *A24B 15/283* (2013.01); *A24F 47/004* (2013.01);
(Continued)

(58) Field of Classification Search
None
See application file for complete search history.

(56) References Cited

U.S. PATENT DOCUMENTS

| 4,858,630 A | 8/1989 | Banerjee et al. |
| 5,167,242 A | 12/1992 | Turner et al. |

(Continued)

FOREIGN PATENT DOCUMENTS

| EA | 012456 B1 | 10/2009 |
| WO | 2008/121610 A1 | 10/2008 |

(Continued)

OTHER PUBLICATIONS

International Search Report and Written Opinion Written Opinion of the International Searching Authority dated Mar. 18, 2015 for PCT/EP2014/079496 filed on Dec. 31, 2014.
(Continued)

*Primary Examiner* — Thor Campbell
(74) *Attorney, Agent, or Firm* — Oblon, McClelland, Maier & Neustadt, L.L.P.

(57) ABSTRACT

An aerosol-generating system is provided, including a nicotine source; a volatile delivery enhancing compound source, wherein a volatile delivery enhancing compound comprises an acid; and a heating means for heating one or both of the nicotine source and the volatile delivery enhancing compound source, wherein one or both of the nicotine source and the volatile delivery enhancing compound source is encapsulated in a cylindrical polymeric capsule, and the cylindrical polymeric capsule includes a thermally conductive material.

13 Claims, 1 Drawing Sheet

Figure 1:
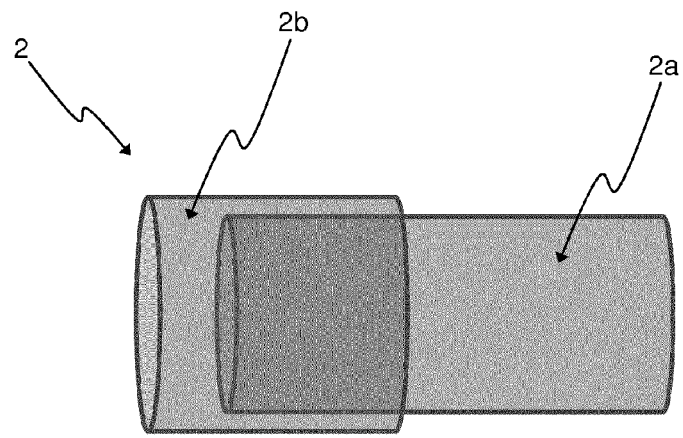

(51) Int. Cl.
*A24B 15/16* (2006.01)
*A24F 47/00* (2006.01)
*A24B 15/28* (2006.01)
*B23K 26/362* (2014.01)
*H05B 1/02* (2006.01)
*H05B 3/42* (2006.01)
*B23K 26/361* (2014.01)

(52) U.S. Cl.
CPC .......... *A24F 47/006* (2013.01); *A24F 47/008* (2013.01); *B23K 26/361* (2015.10); *B23K 26/362* (2013.01); *H05B 1/0297* (2013.01); *H05B 3/42* (2013.01)

(56) References Cited

U.S. PATENT DOCUMENTS

| | | | |
|---|---|---|---|
| 5,400,808 A | | 3/1995 | Turner et al. |
| 7,559,325 B2* | | 7/2009 | Dunkley ............ A61M 15/0028 128/203.21 |
| 9,603,386 B2* | | 3/2017 | Xiang .................... A24F 47/008 |
| 9,675,114 B2* | | 6/2017 | Timmermans ........ A24F 47/008 |
| 9,808,032 B2* | | 11/2017 | Yamada ................ A24F 47/008 |
| 2006/0157075 A1 | | 7/2006 | Gauthier |
| 2008/0241255 A1 | | 10/2008 | Rose et al. |
| 2010/0006113 A1 | | 1/2010 | Urtsev et al. |
| 2012/0255567 A1 | | 10/2012 | Rose et al. |
| 2012/0298123 A1 | | 11/2012 | Woodcock et al. |
| 2013/0014755 A1* | | 1/2013 | Kumar .................. A24F 47/006 128/202.21 |
| 2015/0013698 A1 | | 1/2015 | Woodcock et al. |
| 2017/0340017 A1* | | 11/2017 | Thorens ................ A24F 47/008 |

FOREIGN PATENT DOCUMENTS

| | | |
|---|---|---|
| WO | 2011/034723 A1 | 3/2011 |
| WO | 2011/045609 A1 | 4/2011 |

OTHER PUBLICATIONS

Office Action dated Oct. 10, 2017 in Kazakhstan Patent Application No. 2016/0670.1 (with English language translation).

"DRcaps acid resistant hypromellose capsules Balance between protection and targeted release", CAPSUGEL, 2011, 4 Pages.

M. Ferrand, et al., "Hard Capsules for Dry Powder Inhalers: Performance on Puncturing", 2009, CAPSUGEL pp. 1-4.

* cited by examiner

AEROSOL-GENERATING SYSTEM COMPRISING A CYLINDRICAL POLYMERIC CAPSULE

The present invention relates to an aerosol-generating system comprising a nicotine source and a volatile delivery enhancing compound source. In particular, the present invention relates to an aerosol-generating system comprising a nicotine source and a volatile delivery enhancing compound source for generating an aerosol comprising nicotine salt particles.

Devices for delivering nicotine to a user comprising a nicotine source and a volatile delivery enhancing compound source are known. For example, WO 2008/121610 A1 discloses devices in which nicotine and a volatile delivery enhancing compound are reacted with one another in the gas phase to form an aerosol of nicotine salt particles that is inhaled by the user.

Exemplary Device 2 disclosed in WO 2008/121610 A1 comprises a delivery enhancing compound source 30 and a nicotine source 40 having frangible barrier end caps 35 and 45 heat sealed on the ends. As shown in FIG. 4 of WO 2008/121610 A1, the delivery enhancing compound source 30 and the nicotine source 40 are inserted into a first housing 50 through opposed open ends thereof. The first housing 50, containing the delivery enhancing compound source 30 and the nicotine source 40, is then inserted into a second housing 100. WO 2008/121610 A1 discloses that the first and second housings 50, 100 and the delivery enhancing compound source 30 and the nicotine source 40 are generally extruded plastic tubing. WO 2008/121610 A1 does not provide any information concerning the composition of the frangible barrier end caps 35 and 45.

Nicotine sources and volatile delivery enhancing compound sources for use in aerosol-generating systems of the type disclosed in WO 2008/121610 A1 will have a tendency to lose nicotine and volatile delivery enhancing compound, respectively, when stored for any length of time.

It would be desirable to provide an aerosol-generating system of the type disclosed in WO 2008/121610 A1 in which the retention of one or both of the nicotine and the volatile delivery enhancing compound during storage is improved. In particular, it would be desirable to provide an aerosol-generating system of the type disclosed in WO 2008/121610 A1 in which sufficient nicotine and volatile delivery enhancing compound is retained during storage to generate a desired aerosol of nicotine salt particles for delivery to a user upon use of the aerosol-generating system.

It would also be desirable to provide an aerosol-generating system of the type disclosed in WO 2008/121610 A1 in which one or both of the nicotine and the volatile delivery enhancing compound are retained during storage without degradation by oxidation, hydrolysis or other unwanted reactions, which may alter the properties of the reactants.

It would further be desirable to provide an aerosol-generating system of the type disclosed in WO 2008/121610 A1 in which one or both of the nicotine and the volatile delivery enhancing compound is released only upon use of the aerosol-generating system.

WO 2008/121610 A1 does not address how to optimize the ratio of nicotine and volatile delivery enhancing compound in the gas phase to minimize the amount of unreacted nicotine vapour and delivery enhancing compound vapour delivered to a user.

For example, where the vapour pressure of the volatile delivery enhancing compound is different from the vapour pressure of nicotine, this can lead to a difference in the vapour concentration of the two reactants. A difference in the vapour concentration of the volatile delivery enhancing compound and nicotine can lead to the delivery of unreacted delivery enhancing compound vapour to a user.

It is desirable to produce a maximum quantity of nicotine salt particles for delivery to a user using a minimum quantity of reactants. Consequently, it would be desirable to provide an aerosol-generating system of the type disclosed in WO 2008/121610 A1 that further improves the formation of an aerosol of nicotine salt particles for delivery to a user. It is especially desirable to increase the proportion of the gas phase volatile delivery enhancing compound that is reacted with the gas phase nicotine.

According to the invention there is provided an aerosol-generating system comprising: a nicotine source; a volatile delivery enhancing compound source, wherein the volatile delivery enhancing compound comprises an acid; and a heating means for heating one or both of the nicotine source and the volatile delivery enhancing compound source, wherein one or both of the nicotine source and the volatile delivery enhancing compound source is encapsulated in a cylindrical polymeric capsule comprising a thermally conductive material.

According to the invention there is also provided an aerosol-generating system comprising: an aerosol-generating article comprising a nicotine source and a volatile delivery enhancing compound source, wherein the volatile delivery enhancing compound comprises an acid, wherein one or both of the nicotine source and the volatile delivery enhancing compound source is encapsulated in a cylindrical polymeric capsule comprising a thermally conductive material; and an aerosol-generating device configured to receive the nicotine source and the volatile delivery enhancing compound source of the aerosol-generating article, wherein the aerosol-generating device comprises heating means for heating one or both of the nicotine source and the volatile delivery enhancing compound source.

According to the invention there is further provided use of a cylindrical polymeric capsule comprising a thermally conductive material in an aerosol-generating system for generating a nicotine-containing aerosol comprising a heating means.

As used herein, by "encapsulated" it is meant that the cylindrical polymeric capsule forms a barrier or shell around the nicotine source or the volatile delivery enhancing compound source.

As used herein, the terms "cylinder" and "cylindrical" refer to a substantially right circular cylinder with a pair of opposed substantially planar end faces.

As used herein, the term "aerosol-generating device" refers to a device that interacts with an aerosol-generating article to generate an aerosol that is directly inhalable into a user's lungs thorough the user's mouth.

As used herein, the term "aerosol-generating article" refers to an article comprising an aerosol-forming substrate capable of releasing volatile compounds, which can form an aerosol. In particular, the term "aerosol-generating article" refers to an article comprising a nicotine source and a delivery enhancing compound source capable of releasing nicotine and a delivery enhancing compound that can react with one another in the gas phase to form an aerosol.

Aerosol-generating systems according to the invention comprise a proximal end through which, in use, an aerosol exits the aerosol-generating system for delivery to a user. The proximal end may also be referred to as the mouth end. In use, a user draws on the proximal end of the aerosol-generating article in order to inhale an aerosol generated by the aerosol-generating system. The aerosol-generating system comprises a distal end opposed to the proximal end.

As used herein, the term "longitudinal" is used to describe the direction between the proximal end and the opposed distal end of aerosol-generating systems and components of aerosol-generating systems according to the invention and the term "transverse" is used to describe the direction perpendicular to the longitudinal direction.

As used herein, by "length" is meant the maximum longitudinal dimension between the distal end and the proximal end of components, or portions of components, of aerosol-generating systems according to the invention.

As used herein, by "diameter" is meant the maximum transverse dimension of components, or portions of components, of aerosol-generating systems according to the invention.

As used herein, the terms "upstream" and "downstream" are used to describe the relative positions of components, or portions of components, of aerosol-generating systems according to the invention with respect to the direction of airflow through the aerosol-generating system when a user draws on the proximal end of the aerosol-generating system.

When a user draws on the proximal end of the aerosol-generating system, air is drawn into the aerosol-generating system, passes downstream through the aerosol-generating system and exits the aerosol-generating system at the proximal end.

The proximal end of aerosol-generating systems according to the invention may also be referred to as the downstream end and components, or portions of components, of aerosol-generating systems according to the invention may be described as being upstream or downstream of one another based on their positions relative to the airflow through the aerosol-generating system towards the proximal end.

One or both of the nicotine source and the volatile delivery enhancing compound source may be encapsulated in a cylindrical polymeric capsule comprising a thermally conductive material.

In certain preferred embodiments, the nicotine source and the volatile delivery enhancing compound source are both encapsulated in a cylindrical polymeric capsule comprising a thermally conductive material. In such embodiments, the nicotine source is encapsulated in a first cylindrical polymeric capsule and the volatile delivery enhancing compound source is encapsulated in a second cylindrical polymeric capsule.

Encapsulating one or both of the nicotine source and the volatile delivery enhancing compound source in a cylindrical polymeric capsule advantageously substantially reduces or prevents reaction of the nicotine and the volatile delivery enhancing compound with one another prior to use of the aerosol-generating system.

Where the nicotine source is encapsulated in a cylindrical polymeric capsule, the cylindrical polymeric capsule substantially reduces or prevents evaporation and loss of nicotine from the nicotine source prior to use of the aerosol-generating system. This advantageously improves retention of the nicotine during storage of aerosol-generating systems according to the invention.

The cylindrical polymeric capsule also isolates the nicotine source from exposure to external atmospheric effects and so substantially reduces or prevents reaction of the nicotine with atmospheric oxygen and water prior to use of the aerosol-generating system. This advantageously improves the stability of the nicotine during storage of aerosol-generating systems according to the invention.

Preferably, the cylindrical polymeric capsule forms a barrier or shell around the nicotine source that prevents contact of the nicotine with the atmosphere. In certain embodiments, the cylindrical polymeric capsule may form a barrier or shell around the nicotine source that prevents contact of the nicotine with the atmosphere and reduces or prevents exposure of the nicotine to light.

Preferably, the cylindrical polymeric capsule forms a barrier or shell around the nicotine source that provides an environment for the nicotine such that the nicotine remains stable upon storage at ambient temperature for a period of at least two months, more preferably for a period of at least four months.

Where the volatile delivery enhancing compound source is encapsulated in a cylindrical polymeric capsule, the cylindrical polymeric capsule substantially reduces or prevents evaporation and loss of volatile delivery enhancing compound from the volatile delivery enhancing compound source prior to use of the aerosol-generating system. This advantageously improves retention of the volatile delivery enhancing compound during storage of aerosol-generating systems according to the invention.

The cylindrical polymeric capsule also isolates the volatile delivery enhancing compound source from exposure to external atmospheric effects and so substantially reduces or prevents reaction of the volatile delivery enhancing compound with atmospheric oxygen and water prior to use of the aerosol-generating system. This advantageously improves the stability of the volatile delivery enhancing compound during storage of aerosol-generating systems according to the invention.

Preferably, the cylindrical polymeric capsule forms a barrier or shell around the volatile delivery enhancing compound source that prevents contact of the volatile delivery enhancing compound with the atmosphere. In certain embodiments, the cylindrical polymeric capsule may form a barrier or shell around the volatile delivery enhancing compound source that prevents contact of the volatile delivery enhancing compound with the atmosphere and reduces or prevents exposure of the volatile delivery enhancing compound to light.

Preferably, the cylindrical polymeric capsule forms a barrier or shell around the volatile delivery enhancing compound source that provides an environment for the volatile delivery enhancing compound such that the volatile delivery enhancing compound remains stable upon storage at ambient temperature for a period of at least two months, more preferably for a period of at least four months.

Where the nicotine source is encapsulated in a cylindrical polymeric capsule, the nicotine can be released from the nicotine source when desired by piercing or otherwise opening the cylindrical polymeric capsule in which the nicotine source is encapsulated. Alternatively or in addition, where the volatile delivery enhancing compound source is encapsulated in a cylindrical polymeric capsule, the volatile delivery enhancing compound can be released from the volatile delivery enhancing compound source when desired by piercing or otherwise opening the cylindrical polymeric capsule in which the volatile delivery enhancing compound source is encapsulated. This allows reaction between the nicotine and the volatile delivery enhancing compound in the gas phase to form an aerosol for inhalation by the user.

The cylindrical polymeric capsule may be a two-part capsule.

The cylindrical polymeric capsule may comprise a cylindrical body portion and a removable lid portion. In such embodiments, the cylindrical body portion comprises a first substantially planar end face of the cylindrical polymeric capsule and the removable lid portion comprises an opposed second substantially planar end face of the cylindrical polymeric capsule.

The cylindrical polymeric capsule may comprise a cylindrical body portion and a removable cylindrical lid portion. In such embodiments, the diameter of the removable cylindrical lid portion may be greater than the diameter of the cylindrical body portion so that the removable cylindrical lid portion fits over the cylindrical body portion.

The cylindrical polymeric capsule may have any suitable size.

The cylindrical polymeric capsule may have a length of, for example, between about 4 mm and about 12 mm. In certain preferred embodiments, the cylindrical polymeric capsule has a length of about 8 mm.

The cylindrical polymeric capsule may have a diameter of, for example, between about 4 mm and about 10 mm. In certain preferred embodiments, the cylindrical polymeric capsule has a diameter of about 7 mm.

The cylindrical polymeric capsule may have a thickness of, for example, between about 0.1 mm and about 1.0 mm. In certain preferred embodiments, the cylindrical polymeric capsule has a thickness of between about 0.2 mm and about 0.4 mm.

Where the nicotine source is encapsulated in a cylindrical polymeric capsule, the size of the cylindrical polymeric capsule in which the nicotine source is encapsulated may be chosen to allow a desired amount of nicotine to be included in the nicotine source.

Where the volatile delivery enhancing compound source is encapsulated in a cylindrical polymeric capsule, the size of the cylindrical polymeric capsule in which the volatile delivery enhancing compound source is encapsulated may be chosen to allow a desired amount of volatile delivery enhancing compound to be included in the volatile delivery enhancing compound source.

Where the nicotine source and the volatile delivery enhancing compound source are both encapsulated in a cylindrical polymeric capsule, the cylindrical polymeric capsule in which the nicotine source is encapsulated and the cylindrical polymeric capsule in which the volatile delivery enhancing compound source is encapsulated may be of the same or different sizes.

The cylindrical polymeric capsule may be formed from one or more suitable polymeric materials. Suitable polymeric materials include, but are not limited to, gelatin, polyethylene (PE), polypropylene (PP), polyurethane (PU), fluorinated ethylene propylene (FEP) and combinations thereof.

In certain preferred embodiments, the cylindrical polymeric capsule may be formed from one or more biodegradable polymeric materials. This may advantageously reduce the environmental impact of aerosol-generating systems according to the invention. Suitable biodegradable polymeric materials include, but are not limited to, polylactic acid (PLA) and polyhydroxybutyrate (PHB), cellulose acetate, poly-epsilon-caprolactone (PCL), polyglycolic acid (PGA), polyhydroxyalkanoates (PHAs) and starch-based thermoplastics.

Where the nicotine source and the volatile delivery enhancing compound source are both encapsulated in a cylindrical polymeric capsule, the cylindrical polymeric capsule in which the nicotine source is encapsulated and the cylindrical polymeric capsule in which the volatile delivery enhancing compound source is encapsulated may be formed from the same or different polymeric materials.

Where the nicotine source is encapsulated in a cylindrical polymeric capsule, the cylindrical polymeric capsule in which the nicotine source is encapsulated may be formed from one or more nicotine-resistant polymeric materials.

Alternatively or in addition, where the nicotine source is encapsulated in a cylindrical polymeric capsule, the interior of the cylindrical polymeric capsule in which the nicotine source is encapsulated may be coated with one or more nicotine-resistant polymeric materials.

In such embodiments, the nicotine-resistant polymeric coating on the interior of the cylindrical polymeric capsule in which the nicotine source is encapsulated may have a thickness of, for example, between about 5 µm and about 100 µm. In certain preferred embodiments, the nicotine-resistant polymeric coating on the interior of the cylindrical polymeric capsule in which the nicotine source is encapsulated has a thickness of about 40 µm.

Examples of suitable nicotine-resistant polymeric materials include, but are not limited to, polyethylene (PE), polypropylene (PP), polystyrene (PS), fluorinated ethylene propylene (FEP), polytetrafluoroethylene (PTFE), epoxy resins, polyurethane resins, vinyl resins and combinations thereof.

Use of one or more nicotine-resistant polymeric materials to form or coat the interior of the cylindrical polymeric capsule in which the nicotine source is encapsulated may advantageously enhance the shelf life of aerosol-generating systems according to the invention.

Where the volatile delivery enhancing compound source is encapsulated in a cylindrical polymeric capsule, the cylindrical polymeric capsule in which the volatile delivery enhancing compound source is encapsulated may be formed from one or more volatile delivery enhancing compound-resistant polymeric materials.

Alternatively or in addition, where the volatile delivery enhancing compound source is encapsulated in a cylindrical polymeric capsule, the interior of the cylindrical polymeric capsule in which the volatile delivery enhancing compound source is encapsulated may be coated with one or more volatile delivery enhancing compound-resistant polymeric materials.

In such embodiments, the volatile delivery enhancing compound-resistant polymeric coating on the interior of the cylindrical polymeric capsule in which the volatile delivery enhancing compound source is encapsulated may have a thickness of, for example, between about 5 µm and about 100 µm. In certain preferred embodiments, the volatile delivery enhancing compound-resistant polymeric coating on the interior of the cylindrical polymeric capsule in which the volatile delivery enhancing compound source is encapsulated has a thickness of about 40 µm.

Examples of suitable volatile delivery enhancing compound-resistant polymeric materials include, but are not limited to, polyethylene (PE), polypropylene (PP), polystyrene (PS), fluorinated ethylene propylene (FEP), polytetrafluoroethylene (PTFE), epoxy resins, polyurethane resins, vinyl resins and combinations thereof.

Use of one or more volatile delivery enhancing compound-resistant polymeric materials to form or coat the interior of the cylindrical polymeric capsule in which the volatile delivery enhancing compound source is encapsulated may advantageously enhance the shelf life of aerosol-generating systems according to the invention.

Aerosol-generating systems according to the invention comprise heating means for heating one or both of the nicotine source and the volatile delivery enhancing compound source. As described further below, inclusion of a thermally conductive material in the cylindrical polymeric capsule advantageously facilitates heating of the nicotine source or the volatile delivery enhancing compound source encapsulated in the cylindrical polymeric capsule by the heating means.

The thermally conductive material may be included in one or more walls of the cylindrical polymeric capsule.

In such embodiments the thermally conductive material may be included in one or both of the opposed substantially planar end faces of the cylindrical polymeric capsule. Alternatively or in addition, in such embodiments the thermally conductive material may be included in the circumferential wall of the cylindrical polymeric capsule.

Alternatively or in addition, the thermally conductive material may be included in a polymeric coating provided on at least a portion of the interior surface of the cylindrical polymeric capsule.

In such embodiments the thermally conductive material may be included in a polymeric coating provided on the interior surface of one or both of the opposed substantially planar end faces of the cylindrical polymeric capsule. Alternatively or in addition, in such embodiments the thermally conductive material may be included in a polymeric coating provided on the interior surface of the circumferential wall of the cylindrical polymeric capsule.

In preferred embodiments, the thermally conductive material is included in the circumferential wall of the cylindrical polymeric capsule or in a polymeric coating provided on the interior surface of the circumferential wall of the cylindrical polymeric capsule.

In particularly preferred embodiments, the thermally conductive material is included in the opposed substantially planar end faces and the circumferential wall of the cylindrical polymeric capsule or in a polymeric coating provided on the interior surface of the opposed substantially planar end faces and the circumferential wall of the cylindrical polymeric capsule.

Preferably, the thermally conductive material is substantially homogeneously distributed within the capsule.

The thermally conductive material may be incorporated in one or more polymeric materials used to form the cylindrical polymeric capsule. Alternatively or in addition, a thermally conductive material may be incorporated in one or more polymeric materials used to form a polymeric coating on the interior of the cylindrical polymeric capsule. Inclusion of a thermally conductive material in one or both of one or more polymeric materials used to form the cylindrical polymeric capsule or one or more polymeric materials used to coat the interior of the cylindrical polymeric capsule advantageously increases heat transfer to the nicotine source or the volatile delivery enhancing compound source encapsulated in the cylindrical polymeric capsule.

Preferably, the thermally conductive material has a thermal conductivity of at least about 10 W per meter (W/(m·K)), more preferably at least about 50 W per meter Kelvin (W/(m·K)), most preferably at least about 100 W per meter Kelvin (W/(m·K)) at 23° C. and a relative humidity of 50% as measured using the modified transient plane source (MTPS) method.

Suitable thermally conductive materials include, but are not limited to, metals such as, for example, aluminium. chromium, copper, gold, iron, nickel and silver, alloys, such as brass and steel, and combinations thereof and non-metallic materials such as, for example, diamond, boron carbide (BC), graphite, silicon carbide (SiC), beryllium oxide (BeO), beryllium sulfide (BeS), aluminium nitride (AlN), boron phosphide (BP) and thermally conductive polymers such as, for example, ultra high molecular weight polyethylene (UHMWPE).

A thermally conductive material may be incorporated in one or both of the cylindrical polymeric capsule and a polymeric coating on the interior of the cylindrical polymeric capsule by any suitable method. For example, a plurality of particles of thermally conductive material may be mixed into: one or more polymeric materials used to form the cylindrical polymeric capsule prior to formation of the cylindrical polymeric capsule; or one or more polymeric materials used to form a polymeric coating on the interior of the cylindrical polymeric capsule prior to application of the coating.

In certain preferred embodiments, at least a portion of the cylindrical polymeric capsule has a plurality of particles of thermally conductive material embedded therein.

In certain particularly preferred embodiments, at least a portion of the cylindrical polymeric capsule has a plurality of metal particles embedded therein.

In other preferred embodiments, at least a portion of the interior of the cylindrical polymeric capsule is coated with a polymeric coating comprising a plurality of particles of thermally conductive material.

In other particularly preferred embodiments, at least a portion of the interior of the cylindrical polymeric capsule is coated with a polymeric coating comprising a plurality of metal particles.

Cylindrical polymeric capsules for use in aerosol-generating systems according to the invention may be formed by any suitable method. Suitable methods include, but are not limited to, dipping, blowing, blow moulding and injection moulding.

In particularly preferred embodiments, cylindrical polymeric capsules for use in aerosol-generating systems according to the invention are formed by dipping using cylindrical dipping bars. This advantageously enables the cylindrical polymeric capsules to be mass-produced in a high-speed and cost-effective manner.

Preferably, aerosol-generating systems according to the invention further comprise a piercing member for piercing the cylindrical polymeric capsule. More preferably, aerosol-generating systems according to the invention further comprise a piercing member for piercing the opposed substantially planar end faces of the cylindrical polymeric capsule. In such embodiments, the shape of the cylindrical polymeric capsule advantageously facilitates piercing of the cylindrical polymeric capsule by the piercing member.

Where the nicotine source and the volatile delivery enhancing compound source are both encapsulated in a cylindrical polymeric capsule, aerosol-generating systems according to the invention preferably further comprise a piercing member for piercing both the cylindrical polymeric capsule in which the nicotine source is encapsulated and the cylindrical polymeric capsule in which the volatile delivery enhancing compound is encapsulated.

The piercing member may be formed from any suitable material.

To further facilitate piercing of the cylindrical polymeric capsule by the piercing member, the cylindrical polymeric capsule may comprise one or more regions of reduced strength.

Preferably, one or both of the opposed planar end faces of the cylindrical polymeric capsule are provided with a region of reduced strength. More preferably, both of the opposed planar end faces of the cylindrical polymeric capsule are provided with a region of reduced strength.

The provision of one or more regions of reduced strength advantageously allows the piercing member to pierce the cylindrical polymeric capsule in a controlled and repeatable manner.

The one or more regions of reduced strength may be formed by any suitable method. Suitable methods include, but are not limited to, laser etching, chemical etching and mechanical piercing.

Aerosol-generating systems according to the invention comprise heating means for heating one or both of the nicotine source and the volatile delivery enhancing compound source.

Heating one or both of the nicotine source and the volatile delivery enhancing compound source to a temperature above ambient temperature allows control of the amount of nicotine vapour and volatile delivery enhancing compound vapour released from the nicotine source and the volatile delivery enhancing compound source, respectively. This advantageously enables the vapour concentrations of the nicotine and the volatile delivery enhancing compound to be controlled and balanced proportionally to yield an efficient reaction stoichiometry. This advantageously improves the efficiency of the formation of an aerosol and the consistency of nicotine delivery to a user. It also advantageously reduces the delivery of unreacted nicotine vapour and unreacted volatile delivery enhancing compound vapour to a user.

In certain preferred embodiments, the aerosol-generating system comprises heating means configured to heat one or both of the nicotine source and the volatile delivery enhancing compound source to a temperature of between about 60 degrees Celsius and about 150 degrees Celsius. More, preferably to a temperature of between about 80 degrees Celsius and about 150 degrees Celsius.

In certain preferred embodiments, the aerosol-generating system comprises heating means for heating the nicotine source.

The heating means may comprise an external heater.

As used herein, the term "external heater" refers to a heater that in use is positioned externally to the nicotine source and the volatile delivery enhancing compound source of aerosol-generating systems according to the invention.

The heating means may comprise an external heater disposed about the circumference of one or both of the nicotine source and the volatile delivery enhancing compound source.

In certain embodiments, the heating means may comprise an external heater disposed about the circumference of both the nicotine source and the volatile delivery enhancing compound source.

Alternatively or in addition, the heating means may comprise an internal heater.

As used herein, the term "internal heater" refers to a heater that in use is positioned internally to one or both of the nicotine source and volatile delivery enhancing compound source of aerosol-generating systems according to the invention.

The heating means may be an electric heating means.

Where the heating means is an electric heating means, the aerosol-generating system may further comprise an electric power supply. Alternatively, the electric heating means may be powered by an external electric power supply.

Where the heating means is an electric heating means, the aerosol-generating system may also further comprise electronic circuitry configured to control the supply of electric power from the electric power supply to the electric heating means. Any suitable electronic circuitry may be used in order to control the supply of power to the electric heating means. The electronic circuitry may be programmable.

The electric power supply may be a DC voltage source. In certain embodiments, the electric power supply is a battery. For example, the electric power supply may be a Nickel-metal hydride battery, a Nickel cadmium battery, or a Lithium based battery, for example a Lithium-Cobalt, a Lithium-Iron-Phosphate or a Lithium-Polymer battery. The electric power supply may alternatively be another form of electric charge storage device such as a capacitor. The electric power supply may be rechargeable.

Alternatively, the heating means may be powered by a non-electric power supply, such as a combustible fuel. For example, the heating means may comprise a thermally conductive element that is heated by combustion of a gaseous fuel.

Alternatively, the heating means may be a non-electric heating means, such as a chemical heating means.

In certain embodiments the heating means may comprise a heat sink or heat exchanger configured to transfer thermal energy from an external heat source to one or both of the nicotine source and the volatile delivery enhancing compound source. The heat sink or heat exchanger may be formed of any suitable thermally conductive material. Suitable thermally conductive materials include, but are not limited to, metals, such as aluminium and copper.

In certain particularly preferred embodiments, the aerosol-generating system comprises: a nicotine source; a volatile delivery enhancing compound source; heating means for heating the nicotine source; and a heat transfer barrier between the nicotine source and the delivery enhancing compound source, wherein one or both of the nicotine source and the volatile delivery enhancing compound source is encapsulated in a cylindrical polymeric capsule and wherein the cylindrical polymeric capsule comprises a thermally conductive material.

In such embodiments, the heat transfer barrier separates the nicotine source and the volatile delivery enhancing compound source and is configured to reduce heat transfer between the nicotine source and the volatile delivery enhancing compound source.

Inclusion of a heat transfer barrier between the nicotine source and the volatile delivery enhancing compound source advantageously enables the volatile delivery enhancing compound source to be maintained at a lower temperature while the nicotine source is heated to a higher temperature. In particular, inclusion of a heat transfer barrier between the nicotine source and the volatile delivery enhancing compound source advantageously enables the nicotine delivery of the aerosol-generating system to be significantly increased by increasing the temperature of the nicotine source while the volatile delivery enhancing compound source is maintained at a temperature below the thermal decomposition temperature of the volatile delivery enhancing compound.

Differential heating of the nicotine source and the volatile delivery enhancing compound source advantageously enables the vapour concentrations of the nicotine and the volatile delivery enhancing compound to be controlled and balanced proportionally to yield an efficient reaction stoichiometry. This advantageously improves the efficiency of the formation of an aerosol and the consistency of nicotine delivery to a user.

As used herein, the term "heat transfer barrier" is used to describe a physical barrier that reduces the amount of heat transferred from the nicotine source to the volatile delivery enhancing compound source compared to an aerosol-generating system in which no barrier is present.

The physical barrier may comprise a solid material. For example, in certain embodiments the heat transfer barrier may comprise a solid material having a thermal conductivity of less than about 1 W per meter Kelvin (W/(m·K)) at 23° C. and a relative humidity of 50% as measured using the modified transient plane source (MTPS) method. Alternatively or in addition, the physical barrier may comprise a gas, vacuum or partial vacuum between the nicotine source and the volatile delivery enhancing compound source. For example, in certain embodiments the heat transfer barrier may comprise a cavity having a length of at least about 8 mm.

Where aerosol-generating systems according to the invention comprise a heat transfer barrier between the nicotine source and the volatile delivery enhancing compound source, the heating means is preferably configured to heat the nicotine source to a temperature of between about 80° C. and about 150° C. In such embodiments, the heat transfer barrier is preferably configured so that in use the temperature of the volatile delivery enhancing compound source is below about 60° C. when the nicotine source is heated to a temperature of between 80° C. and 150° C.

Aerosol-generating systems according to the invention comprise a volatile delivery enhancing compound source. As used herein, by "volatile" it is meant the delivery enhancing compound has a vapour pressure of at least about 20 Pa. Unless otherwise stated, all vapour pressures referred to herein are vapour pressures at 25° C. measured in accordance with ASTM E1194-07.

Preferably, the volatile delivery enhancing compound has a vapour pressure of at least about 50 Pa, more preferably at least about 75 Pa, most preferably at least 100 Pa at 25° C.

Preferably, the volatile delivery enhancing compound has a vapour pressure of less than or equal to about 400 Pa, more preferably less than or equal to about 300 Pa, even more preferably less than or equal to about 275 Pa, most preferably less than or equal to about 250 Pa at 25° C.

In certain embodiments, the volatile delivery enhancing compound may have a vapour pressure of between about 20 Pa and about 400 Pa, more preferably between about 20 Pa and about 300 Pa, even more preferably between about 20 Pa and about 275 Pa, most preferably between about 20 Pa and about 250 Pa at 25° C.

In other embodiments, the volatile delivery enhancing compound may have a vapour pressure of between about 50 Pa and about 400 Pa, more preferably between about 50 Pa and about 300 Pa, even more preferably between about 50 Pa and about 275 Pa, most preferably between about 50 Pa and about 250 Pa at 25° C.

In further embodiments, the volatile delivery enhancing compound may have a vapour pressure of between about 75 Pa and about 400 Pa, more preferably between about 75 Pa and about 300 Pa, even more preferably between about 75 Pa and about 275 Pa, most preferably between about 75 Pa and about 250 Pa at 25° C.

In yet further embodiments, the volatile delivery enhancing compound may have a vapour pressure of between about 100 Pa and about 400 Pa, more preferably between about 100 Pa and about 300 Pa, even more preferably between about 100 Pa and about 275 Pa, most preferably between about 100 Pa and about 250 Pa at 25° C.

The volatile delivery enhancing compound may comprise a single compound. Alternatively, the volatile delivery enhancing compound may comprise two or more different compounds.

Where the volatile delivery enhancing compound comprises two or more different compounds, the two or more different compounds in combination preferably have a vapour pressure of at least about 20 Pa at 25° C.

Preferably, the volatile delivery enhancing compound is a volatile liquid.

The volatile delivery enhancing compound may comprise a mixture of two or more different liquid compounds.

The volatile delivery enhancing compound may comprise an aqueous solution of one or more compounds. Alternatively the volatile delivery enhancing compound may comprise a non-aqueous solution of one or more compounds.

The volatile delivery enhancing compound may comprise two or more different volatile compounds. For example, the volatile delivery enhancing compound may comprise a mixture of two or more different volatile liquid compounds.

Alternatively, the volatile delivery enhancing compound may comprise one or more non-volatile compounds and one or more volatile compounds. For example, the volatile delivery enhancing compound may comprise a solution of one or more non-volatile compounds in a volatile solvent or a mixture of one or more non-volatile liquid compounds and one or more volatile liquid compounds.

The volatile delivery enhancing compound comprises an acid. The volatile delivery enhancing compound may comprise an organic acid or an inorganic acid. Preferably, the volatile delivery enhancing compound comprises an organic acid, more preferably a carboxylic acid, most preferably lactic acid or an alpha-keto or 2-oxo acid.

In certain preferred embodiments, the volatile delivery enhancing compound comprises an acid selected from the group consisting of lactic acid, 3-methyl-2-oxopentanoic acid, pyruvic acid, 2-oxopentanoic acid, 4-methyl-2-oxopentanoic acid, 3-methyl-2-oxobutanoic acid, 2-oxooctanoic acid and combinations thereof. In certain particularly preferred embodiments, the volatile delivery enhancing compound comprises lactic acid or pyruvic acid.

In certain embodiments, the volatile delivery enhancing compound source comprises a sorption element and a volatile delivery enhancing compound sorbed on the sorption element.

As used herein, by "sorbed" it is meant that the volatile delivery enhancing compound is adsorbed on the surface of the sorption element, or absorbed in the sorption element, or both adsorbed on and absorbed in the sorption element. Preferably, the volatile delivery enhancing compound is adsorbed on the sorption element.

The sorption element may be formed from any suitable material or combination of materials. For example, the sorption element may comprise one or more of glass, stainless steel, aluminium, polyethylene (PE), polypropylene, polyethylene terephthalate (PET), polybutylene terephthalate (PBT), polytetrafluoroethylene (PTFE), expanded polytetrafluoroethylene (ePTFE), and BAREX®.

In certain preferred embodiments, the sorption element is a porous sorption element. For example, the sorption element may be a porous sorption element comprising one or more materials selected from the group consisting of porous plastic materials, porous polymer fibres and porous glass fibres.

The sorption element is preferably chemically inert with respect to the volatile delivery enhancing compound.

The sorption element may have any suitable size and shape.

In certain preferred embodiments, the sorption element is a substantially cylindrical plug. In certain particularly preferred embodiments, the sorption element is a porous substantially cylindrical plug.

In other preferred embodiments, the sorption element is a substantially cylindrical hollow tube. In other particularly preferred embodiments, the sorption element is a porous substantially cylindrical hollow tube.

The size, shape and composition of the sorption element may be chosen to allow a desired amount of volatile delivery enhancing compound to be sorbed on the sorption element. In certain preferred embodiments, between about 20 μl and about 200 μl, more preferably between about 40 μl and about 150 μl, most preferably between about 50 μl and about 100 μl of the volatile delivery enhancing compound is sorbed on the sorption element.

The sorption element advantageously acts as a reservoir for the volatile delivery enhancing compound.

The nicotine source may comprise one or more of nicotine, nicotine base, a nicotine salt, such as nicotine-HCl, nicotine-bitartrate, or nicotine-ditartrate, or a nicotine derivative.

The nicotine source may comprise natural nicotine or synthetic nicotine.

The nicotine source may comprise pure nicotine, a solution of nicotine in an aqueous or non-aqueous solvent or a liquid tobacco extract.

The nicotine source may further comprise an electrolyte forming compound. The electrolyte forming compound may be selected from the group consisting of alkali metal hydroxides, alkali metal oxides, alkali metal salts, alkaline earth metal oxides, alkaline earth metal hydroxides and combinations thereof.

For example, the nicotine source may comprise an electrolyte forming compound selected from the group consisting of potassium hydroxide, sodium hydroxide, lithium oxide, barium oxide, potassium chloride, sodium chloride, sodium carbonate, sodium citrate, ammonium sulfate and combinations thereof.

In certain embodiments, the nicotine source may comprise an aqueous solution of nicotine, nicotine base, a nicotine salt or a nicotine derivative and an electrolyte forming compound.

Alternatively or in addition, the nicotine source may further comprise other components including, but not limited to, natural flavours, artificial flavours and antioxidants.

The nicotine source may comprise a sorption element and nicotine sorbed on the sorption element.

The sorption element may be formed from any suitable material or combination of materials. For example, the sorption element may comprise one or more of glass, stainless steel, aluminium, polyethylene (PE), polypropylene, polyethylene terephthalate (PET), polybutylene terephthalate (PBT), polytetrafluoroethylene (PTFE), expanded polytetrafluoroethylene (ePTFE), and BAREX®.

In certain preferred embodiments, the sorption element is a porous sorption element. For example, the sorption element may be a porous sorption element comprising one or more materials selected from the group consisting of porous plastic materials, porous polymer fibres and porous glass fibres.

The sorption element is preferably chemically inert with respect to nicotine.

The sorption element may have any suitable size and shape.

In certain preferred embodiments, the sorption element is a substantially cylindrical plug. In certain particularly preferred embodiments, the sorption element is a porous substantially cylindrical plug.

In other preferred embodiments, the sorption element is a substantially cylindrical hollow tube. In other particularly preferred embodiments, the sorption element is a porous substantially cylindrical hollow tube.

The size, shape and composition of the sorption element may be chosen to allow a desired amount of nicotine to be sorbed on the sorption element.

The sorption element advantageously acts as a reservoir for the nicotine.

Aerosol-generating systems according to the invention may comprise a first compartment comprising the nicotine source and a second compartment comprising the volatile delivery enhancing compound source.

As used herein, the term "compartment" is used to describe a chamber or container within the aerosol-generating system comprising the nicotine source or the volatile delivery enhancing compound source.

The first compartment may comprise or consist of the nicotine source encapsulated in a cylindrical polymeric capsule.

The second compartment may comprise or consist of the volatile delivery enhancing compound source encapsulated in a cylindrical polymeric capsule.

The first compartment and the second compartment of the aerosol-generating system may abut one another. Alternatively, the first compartment and the second compartment of the aerosol-generating system may be spaced apart from one another.

The volume of the first compartment and the second compartment may be the same or different. In certain preferred embodiment, the volume of the first compartment is greater than the volume of the second compartment.

As described further below, the first compartment and the second compartment may be arranged in series or parallel within the aerosol-generating system.

As used herein, by "series" it is meant that the first compartment and the second compartment are arranged within the aerosol-generating system so that in use an air stream drawn through the aerosol-generating system passes through one of the first compartment and the second compartment and then passes through the other of the first compartment and the second compartment. Nicotine vapour is released from the nicotine source in the first compartment into the air stream drawn through the aerosol-generating system and volatile delivery enhancing compound vapour is released from the volatile delivery enhancing compound source in the second compartment into the air stream drawn through the aerosol-generating system. The nicotine vapour reacts with the volatile delivery enhancing compound vapour in the gas phase to form an aerosol, which is delivered to a user.

Where the first compartment and the second compartment are arranged in series within the aerosol-generating system, the second compartment is preferably downstream of the first compartment so that in use an air stream drawn through the aerosol-generating article passes through the first compartment and then passes through the second compartment.

Location of the second compartment comprising the volatile delivery enhancing compound source downstream of the first compartment comprising the nicotine source advantageously improves the consistency of the nicotine delivery of aerosol-generating systems according to the invention.

Without being bound by theory, it is believed that location of the volatile delivery enhancing compound source downstream of the nicotine source reduces or prevents deposition of volatile delivery enhancing compound vapour released from the volatile delivery enhancing compound source on the nicotine source during use. This reduces fading over time of the nicotine delivery in aerosol-generating systems according to the invention.

In such embodiments, the nicotine vapour may react with the volatile delivery enhancing compound vapour in the second compartment to form an aerosol. In such embodiments the aerosol-generating system may further comprise a third compartment downstream of the second compartment and the nicotine vapour may alternatively or in addition react with the volatile delivery enhancing compound vapour in the third compartment to form an aerosol.

As used herein, by "parallel" it is meant that the first compartment and the second compartment are arranged within the aerosol-generating system so that in use a first air stream drawn through the aerosol-generating system passes through the first compartment and a second air stream drawn through the aerosol-generating system passes through the second compartment. Nicotine vapour is released from the nicotine source in the first compartment into the first air stream drawn through the aerosol-generating system and volatile delivery enhancing compound vapour is released from the volatile delivery enhancing compound source in the second compartment into the second air stream drawn through the aerosol-generating system. The nicotine vapour in the first air stream reacts with the volatile delivery enhancing compound vapour in the second air stream in the gas phase to form an aerosol, which is delivered to a user.

In such embodiments the aerosol-generating system may further comprise a third compartment downstream of the first compartment and the second compartment and the nicotine vapour in the first air stream may mix and react with the volatile delivery enhancing compound vapour in the second air stream in the third compartment to form an aerosol.

In certain particularly preferred embodiments, the aerosol-generating system comprises: a housing comprising: an air inlet; a first compartment in communication with the air inlet, the first compartment comprising a first one of the nicotine source and the volatile delivery enhancing compound source; a second compartment in communication with the first compartment, the second compartment comprising a second one of the nicotine source and the volatile delivery enhancing compound source; and an air outlet, wherein the air inlet and the air outlet are in communication with each other and configured so that air may pass into the housing through the air inlet, through the housing and out of the housing through the air outlet.

As used herein, the term "air inlet" is used to describe one or more apertures through which air may be drawn into the aerosol-generating system.

As used herein, the term "air outlet" is used to describe one or more apertures through which air may be drawn out of the aerosol-generating system.

In such embodiments, the first compartment and the second compartment are arranged in series from air inlet to air outlet within the housing. That is, the first compartment is downstream of the air inlet, the second compartment is downstream of the first compartment and the air outlet is downstream of the second compartment. In use, a stream of air is drawn into the housing through the air inlet, downstream through the first compartment and the second compartment and out of the housing through the air outlet.

In such embodiments, the first compartment preferably comprises the nicotine source and the second compartment preferably comprises the volatile delivery enhancing source.

The aerosol-generating system may further comprise a third compartment in communication with: the second compartment; and the air outlet. In use in such embodiments, a stream of air is drawn into the housing through the air inlet, downstream through the first compartment, the second compartment and the third compartment and out of the housing through the air outlet.

The aerosol-generating system may further comprise a mouthpiece in communication with: the second compartment or the third compartment, where present; and the air outlet. In use in such embodiments, a stream of air is drawn into the housing through the air inlet, downstream through the first compartment, the second compartment, the third compartment, where present, and the mouthpiece and out of the housing through the air outlet.

In other preferred embodiments, the aerosol-generating system comprises: a housing comprising: an air inlet; a first compartment in communication with the air inlet, the first compartment comprising the nicotine source; a second compartment in communication with the air inlet, the second compartment comprising the volatile delivery enhancing compound source; and an air outlet, wherein the air inlet and the air outlet are in communication with each other and configured so that air may pass into the housing through the air inlet, through the housing and out of the housing through the air outlet.

In such embodiments, the first compartment and the second compartment are arranged in parallel from air inlet to air outlet within the housing. The first compartment and the second compartment are both downstream of the air inlet and upstream of the air outlet. In use, a stream of air is drawn into the housing through the air inlet, a first portion of the stream of air is drawn downstream through the first compartment and a second portion of the stream of air is drawn downstream through the second compartment.

The aerosol-generating system may further comprise a third compartment in communication with: one or both of the first compartment and the second compartment; and the air outlet.

The aerosol-generating system may further comprise a mouthpiece in communication with: the first compartment and the second compartment, or the third compartment, where present; and the air outlet.

In further preferred embodiments, the aerosol-generating system comprises: a housing comprising: a first air inlet; a second air inlet; a first compartment in communication with the first air inlet, the first compartment comprising the nicotine source; a second compartment in communication with the second air inlet, the second compartment comprising the volatile delivery enhancing compound source; and an air outlet, wherein the first air inlet, the second air inlet and the air outlet are in communication with each other and configured so that air may pass into the housing through the first air inlet, through the housing and out of the housing through the air outlet and air may pass into the housing through the first air inlet, through the housing and out of the housing through the air outlet.

In such embodiments, the first compartment and the second compartment are arranged in parallel within the housing. The first compartment is downstream of the first air inlet and upstream of the air outlet and the second compartment is downstream of the second air inlet and upstream of the air outlet. In use, a first stream of air is drawn into the housing through the first air inlet and downstream through the first compartment and a second stream of air is drawn into the housing through the second air inlet and downstream through the second compartment.

The aerosol-generating system may further comprise a third compartment in communication with: one or both of the first compartment and the second compartment; and the air outlet.

The aerosol-generating system may further comprise a mouthpiece in communication with: the first compartment and the second compartment, or the third compartment, where present; and the air outlet.

Where aerosol-generating systems according to the invention comprise a housing, the housing may be designed to be grasped or held by a user.

Preferably, the housing is substantially cylindrical.

Where aerosol-generating systems according to the invention comprise a third compartment, the third compartment may comprise one or more aerosol-modifying agents. For example, the third compartment may comprise one or more sorbents, such as activated carbon, one or more flavourants, such as menthol, or a combination thereof.

Where aerosol-generating systems according to the invention comprise a mouthpiece, the mouthpiece may comprise a filter. The filter may have a low particulate filtration efficiency or very low particulate filtration efficiency. Alternatively, the mouthpiece may comprise a hollow tube.

In certain particularly preferred embodiments, aerosol-generating systems according to the invention comprise: an aerosol-generating article comprising the nicotine source and the volatile delivery enhancing compound source; and an aerosol-generating device configured to receive the nicotine source and the volatile delivery enhancing compound source of the aerosol-generating article.

Preferably, the aerosol-generating article is substantially cylindrical. The aerosol-generating article may simulate the shape and dimensions of a tobacco smoking article, such as a cigarette, a cigar, a cigarillo or a pipe, or a cigarette pack. In certain preferred embodiments, the aerosol-generating article simulates the shape and dimensions of a cigarette.

The aerosol-generating device preferably comprises a cavity configured to receive the nicotine source and the volatile delivery enhancing compound source of the aerosol-generating article.

Preferably, the cavity of the aerosol-generating device is substantially cylindrical.

Preferably, the cavity of the aerosol-generating device has a diameter substantially equal to or slightly greater than the diameter of the aerosol-generating article.

Preferably, the length of the cavity of the aerosol-generating device is less than the length of the aerosol-generating article so that when the aerosol-generating article is received in the cavity of the aerosol-generating device the proximal or downstream end of the aerosol-generating article projects from the cavity of the aerosol-generating device.

The aerosol-generating device preferably comprises heating means as described above for heating one or both of the nicotine source and the volatile delivery enhancing compound source of the aerosol-generating article.

Where the aerosol-generating device comprises a cavity configured to receive the nicotine source and the volatile delivery enhancing compound source of the aerosol-generating article, the heating means may comprise an external heater positioned about a perimeter of the cavity. Alternatively, the heating means may comprise an internal heater positioned within the cavity.

The aerosol-generating device preferably comprises a piercing member as described above for piercing the cylindrical polymeric capsule.

The aerosol-generating article may comprise a first compartment comprising the nicotine source and a second compartment comprising the volatile delivery enhancing compound source as described above. As previously described, the first compartment and the second compartment may be arranged in series or parallel within the aerosol-generating article.

Where the first compartment and the second compartment are arranged in series within the aerosol-generating article, the aerosol-generating device may comprise a piercing member positioned centrally within the cavity of the aerosol-generating device, along the major axis of the cavity, for piercing the first compartment and the second compartment of the aerosol-generating article.

Where the first compartment and the second compartment of the aerosol-generating article are arranged in parallel within the aerosol-generating article, the aerosol-generating device may further comprise a piercing member comprising a first piercing member positioned within the cavity of the aerosol-generating device for piercing the first compartment of the aerosol-generating article and a second piercing member positioned within the cavity of the aerosol-generating device for piercing the second compartment of the aerosol-generating article.

For the avoidance of doubt, features described above in relation to one aspect of the invention may also be applicable to other aspects of the invention. In particular, features described above in relation to aerosol-generating systems according to the invention may also relate, where appropriate, to one or both of aerosol-generating articles and aerosol-generating devices of aerosol-generating systems according to the invention, and vice versa.

All scientific and technical terms used herein have meanings commonly used in the art unless otherwise specified. The definitions provided herein are to facilitate understanding of certain terms used frequently herein.

As used herein, the singular forms "a", "an", and "the" encompass embodiments having plural referents, unless the context clearly dictates otherwise.

The words "preferred" and "preferably" refer to embodiments of the invention that may afford certain benefits, under certain circumstances. Particularly preferred are aerosol-generating systems according to the invention comprising combinations of preferred features. However, it will be appreciated that other embodiments may also be preferred, under the same or other circumstances. Furthermore, the recitation of one or more preferred embodiments does not imply that other embodiments are not useful, and is not intended to exclude other embodiments from the scope of the claims.

Figure 2:
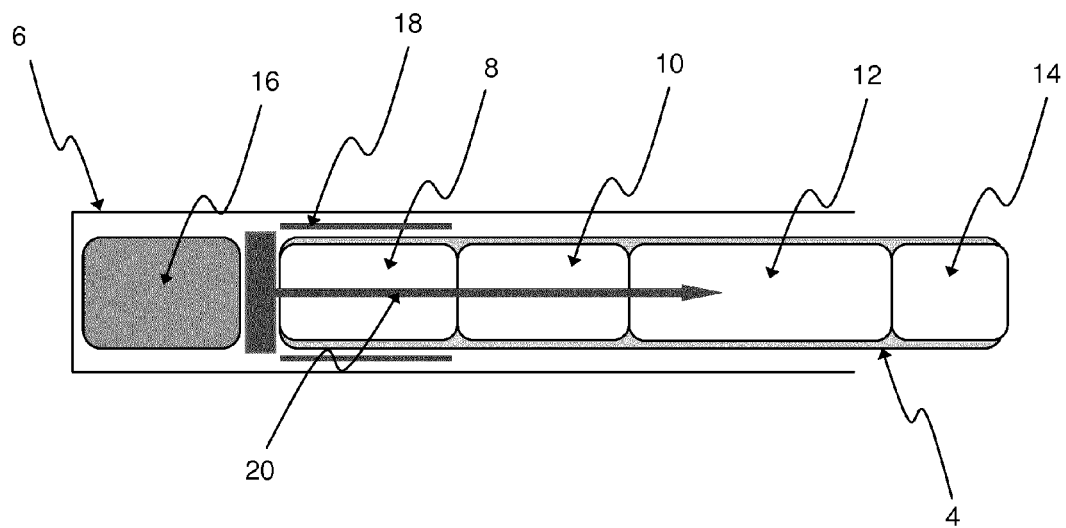

The invention will now be further described with reference to the accompanying drawings in which:

FIG. 1 shows a schematic drawing of a cylindrical polymeric capsule for use in an aerosol-generating system according to the invention; and FIG. 2 shows a schematic longitudinal cross-section of an aerosol-generating system according to an embodiment of the invention comprising: an aerosol-generating article comprising a nicotine source and a volatile delivery enhancing compound source; and an aerosol-generating device configured to receive the nicotine source and the volatile delivery enhancing compound source of the aerosol-generating article.

The cylindrical polymeric capsule 2 shown in FIG. 1 comprises a cylindrical body portion 2a and a removable cylindrical lid portion 2b. A plurality of metals particles (not shown) are embedded in the cylindrical body portion 2a and the removable cylindrical lid portion 2b of the cylindrical polymeric capsule 2. The metal particles are preferably substantially homogenously distributed in the capsule.

The aerosol-generating system shown in FIG. 2 comprises an aerosol-generating article 4 and an aerosol-generating device 6.

The aerosol-generating article 4 has an elongate cylindrical shape and comprises a housing comprising: a first compartment 8 consisting of a nicotine source encapsulated in a cylindrical polymeric capsule 2 of the type shown in FIG. 1; a second compartment 10 consisting of a volatile delivery enhancing compound source encapsulated in a cylindrical polymeric capsule 2 of the type shown in FIG. 1; a third compartment 12; and a mouthpiece 14.

The first compartment 8, the second compartment 10, the third compartment 12 and the mouthpiece 14 are arranged in series and in coaxial alignment within the aerosol-generating article 4. The first compartment 8 is located at the distal end of the aerosol-generating article 4. The second compartment 10 is located immediately downstream of the first compartment 8. The third compartment 12 is located immediately downstream of the second compartment 10. The mouthpiece 14 is located immediately downstream of the third compartment 12 at the proximal end of the aerosol-generating article 4.

A heat transfer barrier (not shown) may be provided between the first compartment 8 and the second compartment 10 to reduce heat transfer between the nicotine source and the volatile delivery enhancing compound source of the aerosol-generating article 4.

The aerosol-generating device 6 comprises a housing comprising an elongate cylindrical cavity in which the aerosol-generating article 4 is received. As shown in FIG. 2, the length of the cavity is less than the length of the aerosol-generating article 4 so that when the aerosol-generating article 4 is inserted into the aerosol-generating device 6 the proximal end of the aerosol-generating article 4 protrudes from the cavity.

The aerosol-generating device 6 further comprises a power supply 16, a controller (not shown), heating means 18, and a piercing element 20. The power supply 16 is a battery and the controller comprises electronic circuitry and is connected to the power supply 16 and the heating means 18.

The heating means 18 comprises an external heating element positioned about the perimeter of a portion of the cavity at the distal end thereof and extends fully around the circumference of the cavity. As shown in FIG. 2, the external heating element is positioned so that it circumscribes the first compartment 8 of the aerosol-generating article 4.

The piercing element 20 is positioned centrally within the cavity of the aerosol-generating device 6 and extends along the major axis of the cavity.

In use, as the aerosol-generating article 4 is inserted into the cavity of the aerosol-generating device 6 the piercing member 20 of the aerosol-generating device 6 is inserted into the aerosol-generating article 4 and pierces the cylindrical polymeric capsule 2 of the first compartment 8 in which the nicotine source is encapsulated and the cylindrical polymeric capsule 2 of the second compartment 10 in which the volatile delivery enhancing compound source is encapsulated. This allows a user to draw air into the housing of the aerosol-generating article 4 through the distal or upstream end thereof, downstream through the first compartment 8, the second compartment 10 and the third compartment 12 and out of the housing through the mouthpiece 14 at the proximal end thereof.

As the user draws air through the aerosol-generating article 4, nicotine vapour is released from the nicotine source in the first compartment 8 into the air stream drawn through the aerosol-generating article 4 and volatile delivery enhancing compound vapour is released from the volatile delivery enhancing compound source in the second compartment 10 into the air stream drawn through the aerosol-generating article 4. The nicotine vapour reacts with the volatile delivery enhancing compound vapour in the gas phase in the second compartment 10 and the third compartment 12 to form an aerosol, which is delivered to the user through the mouthpiece 14 at the proximal end of the aerosol-generating article 4.

The external heating element of the heating means 18 heats the first compartment 6 of the aerosol-generating article 4 received in the cavity of the aerosol-generating device 6. The plurality of metals particles embedded in the cylindrical body portion 2a and the removable cylindrical lid portion 2b of the cylindrical polymeric capsule 2 increase heat transfer to the nicotine source encapsulated in the cylindrical polymeric capsule 2 and so facilitate heating of the nicotine source by the external heating element of the heating means 18.

In an alternative embodiment of the invention (not shown), the external heating element heating means 18 is positioned so that it circumscribes the first compartment 8 and the second compartment 10 of the aerosol-generating article 4. In this alternative embodiment, the external heating element of the heating means 18 heats the first compartment 6 and the second compartment 10 of the aerosol-generating article 4 received in the cavity of the aerosol-generating device 6.

The invention has been exemplified above by reference to an aerosol-generating system comprising a nicotine source and a volatile delivery enhancing compound source, wherein both the nicotine source and the volatile delivery enhancing compound source are encapsulated in a cylindrical polymeric capsule comprising a thermally conductive material. However, it will be appreciated that in other embodiments only one of the nicotine source and the volatile delivery enhancing compound source of aerosol-generating systems according to the invention may be encapsulated in a cylindrical polymeric capsule comprising a thermally conductive material.

For example, in other embodiments one of the nicotine source and the volatile delivery enhancing compound source may be encapsulated in a cylindrical polymeric capsule comprising a thermally conductive material and the other of the nicotine source and the volatile delivery enhancing compound source may be encapsulated in a cylindrical polymeric capsule that does not comprise a thermally conductive material.

The invention has also been exemplified above by reference to an aerosol-generating system comprising an aerosol-generating article comprising a nicotine source and a volatile delivery enhancing compound source arranged in series within the aerosol-generating article. However, it will be appreciated that in other embodiments the nicotine source and the volatile delivery enhancing compound source of aerosol-generating systems according to the invention may be arranged in parallel.

The invention claimed is:

1. An aerosol-generating system, comprising:
   a nicotine source;
   a volatile delivery enhancing compound source comprising a volatile delivery enhancing compound, which comprises an acid; and
   a heating means for heating one or both of the nicotine source and the volatile delivery enhancing compound source,
   wherein one or both of the nicotine source and the volatile delivery enhancing compound source is encapsulated in a cylindrical polymeric capsule comprising a thermally conductive material having a thermal conductivity of at least about 10 W/(m·K), and
   wherein the thermally conductive material is included in one or both of: one or more walls of the cylindrical polymeric capsule, and a polymeric coating provided on at least part of an interior surface of the cylindrical polymeric capsule.

2. The aerosol-generating system according to claim 1, wherein the thermally conductive material is substantially homogenously distributed within the cylindrical polymeric capsule.

3. The aerosol-generating system according to claim 1, wherein the nicotine source is encapsulated in the cylindrical polymeric capsule.

4. The aerosol-generating system according to claim 3, wherein the interior of the cylindrical polymeric capsule in which the nicotine source is encapsulated is coated with one or more nicotine-resistant polymeric materials.

5. The aerosol-generating system according to claim 1, wherein the volatile delivery enhancing compound source is encapsulated in the cylindrical polymeric capsule.

6. The aerosol-generating system according to claim 5, wherein the interior of the cylindrical polymeric capsule in which the volatile delivery enhancing compound source is encapsulated is coated with one or more volatile delivery enhancing compound-resistant polymeric materials.

7. The aerosol-generating system according to claim 1, further comprising a piercing member for piercing the cylindrical polymeric capsule.

8. The aerosol-generating system according to claim 7, wherein the cylindrical polymeric capsule comprises one or more regions of reduced strength configured to facilitate piercing of the cylindrical polymeric capsule by the piercing member.

9. The aerosol-generating system according to claim 8, wherein the one or more regions of reduced strength are formed by laser etching.

10. The aerosol-generating system according to claim 1, further comprising:
    an aerosol-generating article comprising the nicotine source and the volatile delivery enhancing compound source; and
    an aerosol-generating device configured to receive the nicotine source and the volatile delivery enhancing compound source of the aerosol-generating article,
    wherein the aerosol-generating device comprises the heating means for heating one or both of the nicotine source and the volatile delivery enhancing compound source of the aerosol-generating article.

11. The aerosol-generating system according to claim 10, wherein the aerosol-generating device comprises a piercing member for piercing the cylindrical polymeric capsule.

12. An aerosol-generating article for use in the aerosol-generating system according to claim 1,
    the aerosol-generating article comprising the nicotine source and the volatile delivery enhancing compound source; and
    the aerosol-generating system further comprising an aerosol-generating device configured to receive the nicotine source and the volatile delivery enhancing compound source of the aerosol-generating article,
    wherein the aerosol-generating device comprises the heating means for heating one or both of the nicotine source and the volatile delivery enhancing compound source of the aerosol-generating article.

13. A cylindrical polymeric capsule, comprising:
    a thermally conductive material having a thermal conductivity of at least about 10 W/(m·K) disposed in an aerosol-generating system for generating a nicotine-containing aerosol, the system comprising a heating means,
    wherein the thermally conductive material is included in one or both of one or more walls of the cylindrical polymeric capsule, and a polymeric coating provided on at least part of an interior surface of the cylindrical polymeric capsule.

* * * * *